UNITED STATES PATENT OFFICE.

JONATHAN SCHARR, OF PHILADELPHIA, PENNSYLVANIA.

LIQUID SOAP.

SPECIFICATION forming part of Letters Patent No. 266,207, dated October 17, 1882.

Application filed August 14, 1882. (No specimens.) Patented in England April 4, 1877, No. 1,319; in Belgium April 30, 1877, No. 41,941, and in France June 20, 1877, No. 117,961.

*To all whom it may concern:*

Be it known that I, JONATHAN SCHARR, a citizen of Germany, residing at Philadelphia, in the county of Philadelphia and State of Pennsylvania, have invented certain new and useful Improvements in Liquid Soap; and I do declare the following to be a full, clear, and exact description of the invention, such as will enable others skilled in the art to which it appertains to make and use the same.

The object of my invention is to produce a liquid soap that will thoroughly scour wool, yarn, woolen, or other woven or felted substances.

To produce one hundred gallons of liquid soap, I begin with about sixty-six gallons of water and add while it is cold the following: from about twelve to twenty-one pounds of linseed and two pounds of farina-starch. These articles are placed in some suitable receptacle and boiled, preferably by the injection of steam, for fifteen or twenty minutes. Afterward the following ingredients are added: about thirteen pounds of calcined potash; one hundred and sixty-two pounds of refined soda-ash, (50° free from caustic;) twelve pounds of resin, (virgin or good amber;) four pounds of borax; three pounds of sal-ammoniac; two gallons of oleine-oil; three quarts of spirits of turpentine; two quarts of liquid ammonia, 880° of strength, mixed with from four to six quarts of water previous to being added to the other ingredients. The whole of the ingredients is then boiled about one hour and a half, (Baumé's hydrometer showing 13°, with the liquid at boiling-point.) The liquid, after being thus boiled, is passed through a sieve, so as to extract the thick part, and it is then ready for use. The thick part that remains in the sieve is used for a second boiling.

To produce one hundred gallons for a second boiling, I begin with about sixty-six gallons of water, and then add the thick part caught in the sieve from the first boiling and two pounds of farina-starch. The steam is then turned on and the following ingredients added: about eight pounds of calcined potash; one hundred and fifty pounds of refined soda-ash, (50° free from caustic;) seven pounds of resin, (virgin or good amber;) three pounds of borax; two pounds of sal-ammoniac; one and a half gallon of oleine-oil; two quarts of spirits of turpentine; two quarts of liquid ammonia, 880° of strength, mixed with from four to six quarts of water previous to being added to the other ingredients. The whole of the ingredients are then boiled for two hours, (Baumé's hydrometer to show 13°, with liquid at the boiling-point,) and after being run through a sieve is ready for use. The thick part remaining in the sieve after this boiling is useless.

For producing a boiling-heat injected steam is preferable in all cases.

When the soap is to be used for bleaching linen or cotton, twelve pounds of linseed is used in the first boiling; if for wool or woolen fabrics, twenty-one pounds should be put in.

Instead of the linseed and farina-starch, twelve or fifteen pounds of Iceland, or Irish moss may be used, in which case the thick part remaining in the sieve may be used from four to six times.

The calcined potash may be left out entirely if the soap is to be used for bleaching linen or cotton; but it should be put in if the soap is to be used on wool or woolen fabrics.

I would have it understood that I do not limit myself to the exact proportions given, which are taken as an approximate, and the quantity of each ingredient may be varied in accordance with the nature or quality of the material or the purpose for which it is required.

What I claim, and desire to secure by Letters Patent of the United States, is—

The herein-described liquid soap, consisting of water, linseed, farina-starch, (or, in lieu of the linseed and the farina-starch, Irish or Iceland moss,) refined soda, resin, borax, sal-ammoniac, oleine-oil, spirits of turpentine, and liquid ammonia, to which ingredients may be added calcined potash, substantially as and for the purpose herein described.

In testimony whereof I affix my signature in presence of two witnesses.

JONATHAN SCHARR.

Witnesses:
A. J. D. DIXON,
THOS. D. MOWLDS.